United States Patent Office 3,461,161
Patented Aug. 12, 1969

3,461,161
WATER-SOLUBLE TETRACYCLINE DERIVATIVES
Werner Rogalski and Helmut Wahlig, Darmstadt, and Ludwig Hepding, Darmstadt-Eberstadt, Germany, assignors to E. Merck A.G., Darmstadt, Germany
No Drawing. Filed Nov. 15, 1966, Ser. No. 594,402
Claims priority, application Germany, Nov. 20, 1965, M 67,332
Int. Cl. C07c *103/19;* A61k *21/00*
U.S. Cl. 260—559         1 Claim

ABSTRACT OF THE DISCLOSURE

N-[(1-carbamoyl-3-methylthiopropyl)aminomethyl]-tetracycline and pharmaceutically acceptable acid addition salts thereof exhibit high water solubilities and are especially valuable for parenteral administration.

---

This invention relates to tetracyclines, and in particular to a process of preparing water-soluble tetracycline derivatives, and the products produced thereby.

Tetracyclines themselves are only very slightly soluble in water, and this makes parenteral application particularly difficult. It is already known, however, that tetracyclines can be converted to water-soluble derivatives by reacting them with formaldehyde and suitable amines by a Mannich reaction. The solubilities of these known amino-methylated derivatives, such as pyrrolidinomethyl tetracycline, 4'-(β-hydroxyethyl)-piperazinomethyl-tetracycline, N-methyl-piperazine-chlorotetracycline-diacetate, 1,4-bis-(tetracycline-N-methyl)-piperazine and 1-lysino-methyl-tetracycline, are in the range of between 1.00 and 1.85 g./ml. For parenteral application in particular, though, it would be desirable to have tetracyclines having even higher solubilities.

A principal object of this invention, therefore, is to provide tetracycline derivatives having a relatively high solubility in water.

Another object is to provide pharmaceutical compositions particularly for parenteral administration of these new tetracycline derivatives. Concomitantly, another object is to provide methods of administering these derivatives to mammals and avian species.

Still another object is to provide a process for producing these new tetracycline derivatives.

Upon further study of the specification and claims, other objects and advantages of the present invention will become apparent.

For the attainment of the above objects, it has now been found that new and considerably better water-soluble derivatives of tetracycline antibiotics are obtained if methionine amide is used as the amine during the Mannich condensation. The resultant new products are stable substances which have a high solubility in water, not only in a relatively acidic solution, but even near the neutral point. Compared to the known aminomethyl-tetracycline derivatives, the solubilities of the compounds of this invention are significantly superior. Of further importance is that neither the antibiotic activity nor the bacterial spectrum of the new derivatives (evaluated on the basis of a tetracycline base) is diminished in comparison with the basic tetracyclines.

Basically, the compounds of this invention are produced by a process for condensation of a tetracycline with formaldehyde and an amine in the presence of a solvent and, if desired, in the presence of an acid, the departure from the prior art being that methionine amide is employed as the amine.

All tetracycline antibiotics can be used as the starting components, particularly tetracycline, oxytetracycline, chlorotetracycline, demethyltetracycline, desmethylchlorotetracycline as well as their isomers and anhydro compounds. According to the process of the invention, these tetracyclines are preferably used in the reaction in the form of their free bases. For the purposes of simplicity, the expression "a tetracycline" will be used in the claims to designate all these types of tetracycline compounds unless designated more specifically. However, the salts, particularly the salts of organic carboxylic acids, can also be used.

The formaldehyde necessary for amino-methylation can be used either in aqueous solution or dissolved in organic solvents, particularly in methanol, or in gaseous or solid (polymer) form. Formaldehyde-yielding agents, e.g., chloromethyl ether, can also be used instead of the formaldehyde itself.

Condensation is conducted in accordance with the usual conditions of a Mannich condensation. Whereas a temperature between 10 and 60° C. can be selected, it is frequently preferred that the condensation be carried out at above room temperature (e.g., 30 to 50° C.).

The reaction of a tetracycline with formaldehyde and the amide can be conducted in a one-stage process by reacting all three component simultaneously. However, it is also possible to first react the formaldehyde with either one of the two components, and then the third is thereafter added.

In the reaction, a tetracycline can be used either in a dissolved form or as a suspension. Particularly suitable solvents are alcohols such as methanol, isopropanol, tert.-butanol, n-propanol, n-butanol, cyclic ethers such as tetrahydrofuran and dioxane or solvent mixtures. If desired, the reaction mixture can also contain a minor concentration of water, particularly when the formaldehyde is added as an aqueous solution.

The methionine amide can be used in the form of the free base or as a salt of organic or inorganic acids, in which case the corresponding salts of the water-soluble tetracycline derivatives are obtained directly. However, the acid salts of the tetracyclines can also be reacted with the free amine and formaldehyde, and the corresponding salts of the tetracycline derivatives can be obtained in this manner. Alternatively, it is further possible to react the tetracycline base with formaldehyde and the free amine, and then to add an acid to the reaction mixture before, during or after the reaction. In any case, the methionine amide is preferably used in the form of the free base and is preferably converted to a water-soluble tetracycline.

To carry out the reaction, about 1 mol of a tetracycline is reacted with about 1.0 to 2.0 mol formaldehyde and about 1 mol methionine amide.

The preferred physiologically acceptable acids to be used according to the present invention are mono-, di- and tricarboxylic acids such as acetic, malic, tartaric, citric, ascorbic, malonic, succinic, adipic, glutaminic, and glutaric acid.

Aside from superior water solubilities, the new compounds are characterized by beneficial therapeutic properties. Their toxicity and local irritating effect are reduced in comparison to the known aminomethyl-tetracycline derivatives. The novel compounds are, therefore, very well tolerated by mammals, as well as avian species, particularly when administered in the form of aqueous solutions. In addition, higher blood level concentrations of the antibiotic can be attained as compared to the tetracycline derivatives known heretofore.

The novel compounds can be employed with conventional pharmaceutical excipients in all forms of pharmaceutical preparations commonly used in this field. Besides tablets, pills, coated tablets, and suppositories, injectable preparations are the preferred dosage unit forms. Especially useful are substantially anhydrous mixtures giving, upon reconstitution with water, aqueous, injectable therapeutic solutions. Usually, the ampoules contain dry mixtuers of the ingredients which are dissolved before use in sterile pyrogeen-free distilled water or, if preferred, with physiological saline solution. The dry mixtures are preferably prepared by freeze-drying. The novel antibiotic compositions are of enhanced stability both as a dry powder and as an aqueous solution.

Of course, all such pharmaceutical preparations may contain in addition all the ingredients that are usually added to this type of drugs. Thus, nontoxic water-soluble acidifying agents may be added to adjust the pH value of the solution resulting from the reconstitution of the dry mixture with water to the desired value. The preferred acidifying agents are ascorbic acid, citric acid, malic acid and tartaric acid.

Further suitable ingredients are, for example, magnesium or calcium salts such as the gluconates or ascorbates, urea and nicotinamide. When the therapeutic compositions of this invention are to be administered intramuscularly, it is frequently desirable to add a local anesthetic such as procaine hydrochloride or lidocaine hydrochloride.

The dry mixtures are stable for years under normal storage conditions, e.g. at room temperature. Frequently, use is made of vials having a capacity of about 1 to 6 ml. Such vials provide conveniently a single dosage but, of course, larger sizes may also be used. The injection solution is usually prepared by adding about 1 to 3 ml. of sterile, pyrogen-free water to the dry mixture. Within a few seconds, all the dry mixture goes into solution and the product is ready for use; the resulting solution is stable for several hours but is normally used immediately.

Because the final product, after reconstitution with water, is a true solution, the particle size of the ingredients of the dry mixture is not of great importance. However, in order to speed up the rate of solution of these dry solids upon reconstitution, it is desirable to have all ingredients in small particle size. This goal is preferably attained by freeze-drying the solution.

A preferred specific embodiment for such a mixture in an ampoule is, for example the following:

| | Mg. |
|---|---|
| N - (1 - carbamoyl - 3 - methylthiopropylaminomethyl)-tetracycline | 315 |
| Calcium gluconate | 150 |
| Calcium ascorbate | 50 |

A composition of this type was administered parenterally to rabbits and dogs upon reconstitution with 2 ml. of sterile water. The blood levels were measured after periods of 1, 2 and 8 hours after administration and showed good results.

The novel compounds and compositions according to the present invention are to be used as drugs in the treatment of bacterial infections in the same manner as the tetracycline derivatives known up to now.

The novel tetracycline derivatives are preferably administered in dosages of 10–1000 mg. per dosage unit. In such pharmaceutical compositions, the carrier is usually present in an amount of 100 to 3000 mg.

Parenteral compositions are preferably formulated in ampoules as unit dosages. In this connection, a unit dosage preferably comprises about 10 to 1000 mg., preferably about 100–700 mg. of a tetracycline derivative of this invention. For administration in pediatrics, usually dosages between 10 and 125 mg. are used. For intraveous and intramuscular administration, about 1 to 10 ml. of water are to be used for each dosage unit in ampoule form. In addition, further ingredients as described above may be incorporated in the ampoules.

Without further elaboration, it is believed that one skilled in the art can, using the preceding description, utilize the present invention to its fullest extent. The following preferred specific embodiments are, therefore, to be construed as merely allustrative, and not limitative of the remainder of the disclosure in any way whatsoever.

Example 1

7.6 g. methionine amide and 5 ml. of a 35% aqueous formaldehyde solution in 50 mol. isopropanol are left standing at room temperature for 30 minutes. This solution is then added to a solution of 22.2 g. tetracycline base in 300 ml. isopropanol, heated to 50° C., the reaction product precipitating after only a short time. After having stirred at room temperature for 16 hours the resultant crystallizate is separated by filtration. The crystalline filter cake is suspended in 250 ml. absolute ether, and the suspension stirred for 15 minutes at room temperature, and then re-filtered. The filter cake is washed twice with 50 g. absolute ether, and then dried at 40° C. under reduced pressure. Yield: 23.6 g.

By concentrating the mother liquor, a second crystalline fraction can be obtained, so that the total yield of the methionine amide tetracycline product is 27.2 g. (90% of theory). M.P.: 145–150° C. under decomposition.

The pH value of a 2% aqueous solution of the thus-obtained N-(1-carbamoyl-3-methylthiopropylaminomethyl)-tetracycline is 7.2–7.4. The solubility in water is 2.1 g./ml. at room temperature.

Empirical formula: $C_{28}M_{36}N_4O_9S$; mol. wt.: 604.7.

Analysis.—Calculated: C, 55.62%; H, 6.00%; N, 9.27%; S, 5.30%. Found: C, 55.30%; H, 6.15%; N, 9.00%; S, 5.17%. $(\alpha)_D$ −222° (water).

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What we claim is:

1. A member selected from the group consisting of an N - [(1 - carbamoyl - 3 - methylthiopropyl)aminomethyl]-tetracycline and physiologically acceptable acid addition salts thereof.

References Cited

UNITED STATES PATENTS 3,275,652   9/1966   Martell et al.

ALEX MAZEL, Primary Examiner

ANNE MARIE TIGHE, Assistant Examiner

U.S. Cl. X.R.

424—227